United States Patent [19]

Sheth

[11] 4,309,398
[45] Jan. 5, 1982

[54] CONVERSION OF ALKALI METAL SULFATE TO THE CARBONATE

[75] Inventor: Atul C. Sheth, Woodridge, Ill.

[73] Assignee: The United States of America as represented by the United States Department of Energy, Washington, D.C.

[21] Appl. No.: 80,726

[22] Filed: Oct. 1, 1979

[51] Int. Cl.$^3$ .................. H02K 44/00; C01D 7/00; C01B 17/16; C01B 17/00
[52] U.S. Cl. .................................. 423/428; 310/11; 423/561 R; 423/561 A; 423/563; 423/566
[58] Field of Search ............... 423/542, 421, 422, 428, 423/431, 561 A, 566, 168, 208, 573, 563; 310/11

[56] References Cited

U.S. PATENT DOCUMENTS

| | | | |
|---|---|---|---|
| 1,045,769 | 11/1912 | Bollo et al. | 423/566 |
| 1,560,900 | 11/1925 | Drewsew | 423/428 |
| 1,565,300 | 12/1925 | White | 423/566 |
| 2,383,247 | 8/1945 | Gardner | 423/428 |
| 2,675,297 | 4/1954 | Gray et al. | 423/428 |
| 3,127,237 | 3/1964 | Markant | 423/428 |
| 3,401,010 | 9/1968 | Guerrieri | 423/428 |
| 3,707,462 | 12/1972 | Moss | 423/542 |
| 4,243,645 | 1/1981 | Lahonda | 423/428 |

OTHER PUBLICATIONS

White et al., Manufacture of Sodium Sulfate, I & EC, vol. 28, #7, Feb. 1936, pp. 244-246.

Primary Examiner—Gary P. Straub
Attorney, Agent, or Firm—Hugh W. Glenn; Frank H. Jackson; James E. Denny

[57] ABSTRACT

A process for converting potassium sulfate to potassium carbonate in which a mixture of potassium sulfate and calcium oxide are reacted at a temperature in the range of between about 700° C. and about 800° C. with a gaseous mixture having a minor amount of hydrogen and/or carbon monoxide in a diluent with the calcium oxide being present in an amount not greater than about 20 percent by weight of the potassium sulfate to produce an aqueous mixture of potassium sulfide, potassium bisulfide, potassium hydroxide and calcium sulfide and a gaseous mixture of steam and hydrogen sulfide. The potassium and calcium salts are quenched to produce an aqueous slurry of soluble potassium salts and insoluble calcium salts and a gaseous mixture of steam and hydrogen sulfide. The insoluble calcium salts are then separated from the aqueous solution of soluble potassium salts. The calcium salts are dried to produce calcium sulfide, calcium bisulfide and steam, and then, the calcium sulfide and calcium bisulfide are converted to the oxide and recycled. The soluble potassium salts are carbonated to produce potassium carbonate which is concentrated and the precipitated crystals separated. The sulfur-containing compounds are further treated.

10 Claims, 2 Drawing Figures

CONVERSION OF ALKALI METAL SULFATE TO THE CARBONATE

CONTRACTUAL ORIGIN OF THE INVENTION

The invention described herein was made in the course of, or under, a contract with the U.S. Department of Energy.

BACKGROUND OF THE INVENTION

The open-cycle, coal-fired MHD power system, in addition to having a higher efficiency than other fossil-fueled power systems, has the advantage of a self-contained sulfur removal capability. The potassium seed plays a dual role, both increasing the electrical conductivity of the hot combustion gases by thermal ionization and eliminating sulfur dioxide from the gaseous effluent. The spent seed is collected in various down stream components, predominantly as a mixture of water-soluble salts, these being potassium carbonate and potassium sulfate contaminated with fly ash, a typical analysis of the spent seed being estimated as 95 percent potassium sulfate and potassium carbonate and 5 percent fly ash. Because of the high cost of the seed material, currently about 20 cents per pound for potassium carbonate and about 5 cents per pound for potassium sulfate, and the large quantities of seed material required in a MHD power system, a potassium throw-away system for sulfur removal is possible only if there is an adequate supply of potassium carbonate and a sufficient demand for potassium sulfate. Presently, it is not economically feasible to consider a potassium throw-away system, and it is necessary to exploit the desulfurization capability of the MHD seed material for an economical power system, whereby the recovered potassium sulfate must efficiently be converted to potassium carbonate and reused, while sulfur is being collected and treated rather than being disposed to the environment.

The sulfur removing capability of the potassium carbonate seed is critically important when high sulfur coal such as Illinois number 6 coal, the characteristics of which are set forth in Table I below, is used as a fuel in the coal-fired MHD power system. Calculations have showed that it is necessary that at least about 80 to 85% of the potassium sulfate produced in the MHD power system be reconverted to potassium carbonate for economic reasons while restoring the desulfurization capability of the MHD seed to satisfy current EPA emission limits of about 1.2 pounds sulfur dioxide per million BTUs.

TABLE I

| Characteristics of Washed Illinois #6 Coal | | | |
|---|---|---|---|
| Proximate Analysis, wt % | | Ultimate Analysis, wt % | |
| Moisture | 12.05 | Moisture | 12.05 |
| Ash | 10.40 | Ash | 10.40 |
| Volatile Matter | 36.05 | Sulfur | 3.40 |
| Carbon | 41.50 | Carbon | 60.72 |
| | | Hydrogen | 4.22 |
| | | Nitrogen | 1.14 |
| | | Chlorine | 0.02 |
| | | Oxygen | 8.05 |
| Ash Analysis (ignited basis), wt % | | | |
| $P_2O_5$ | 0.08 | | |
| $SiO_2$ | 50.83 | | |
| $Fe_2O_3$ | 21.13 | | |
| $Al_2O_3$ | 18.33 | | |
| $TiO_2$ | 0.81 | | |

TABLE I-continued

| Characteristics of Washed Illinois #6 Coal | |
|---|---|
| CaO | 3.20 |
| MgO | 0.96 |
| $SO_3$ | 2.30 |
| $K_2O$ | 1.93 |
| $Na_2O$ | 0.38 |
| Undetermined | 0.05 |
| TOTAL | 100.00 |

Heating Value: 11,100 Btu/lb
Free Swelling Index: 3.0
Hardgrove Grindability: 56

In order for the MHD power system to function adequately, the potassium sulfate conversion to potassium carbonate must be both economical and time effective. Various commercial processes for the conversion of alkali metal sulfate to the corresponding carbonate are available, but none is both economical and time effective. Representative commercially available processes are disclosed in the Guerrieri U.S. Pat. No. 3,301,010 issued Sept. 10, 1968 and the Markant U.S. Pat. No. 3,127,237 issued Mar. 31, 1964 and the Nylander U.S. Pat. No. 3,134,639 issued May 26, 1964. Although these patents illustrate methods for treating alkali metal sulfates, none provides a sufficiently rapid and economical method for treatment of the large quantities of potassium sulfate produced in an MHD power system.

Additional work has been performed by the Pittsburgh Energy Research Center (PERC) relative to a process for treating potassium sulfate. The PERC process involves treatment of potassium sulfate with carbon monoxide and hydrogen gas at a temperature in the range of between about 700° C. and 800° C. to produce potassium sulfide and carbon dioxide and steam which reacts at about 500° C. to form potassium carbonate with the evolution of hydrogen sulfide. Calculated conversion values for the PERC reduction reaction using pure hydrogen and pure carbon monoxide at 750° C. are 2.5% and 2% conversion per pass, respectively. For the regeneration step at 500° C., the calculated conversion for a mixture of 50% carbon dioxide and 50% steam was only 3.9% per pass.

SUMMARY OF THE INVENTION

It is a principal object of the present invention to provide an improved process for conversion of an alkali metal sulfate to the corresponding carbonate using coal producer gas in dilute quantities which provides at least 80% conversion within one hour reaction time.

Another object of the present invention is to provide a process for converting alkali metal sulfate to the corresponding carbonate comprising reacting the alkali metal sulfate with a gaseous mixture containing a minor amount of a gas selected from the class consisting of hydrogen, carbon monoxide and combinations thereof in a diluent with a sufficient amount of an oxide of a metal selected from the class consisting of calcium, boron, zinc, iron and mixtures thereof to react not less than about 80% of the alkali metal sulfate within a time span not to exceed about one hour; adding water to form an aqueous slurry of soluble metal salts and insoluble salts; separating the insoluble salts from the aqueous phase; and carbonating the aqueous phase to form an alkali metal carbonate.

A further object of the present invention is to provide a process of the type set forth in which the alkali metal is potassium and the gaseous mixture contains not more than about 20% by volume of coal producer gas with the remainder being helium.

A still further object of the present invention is to provide a process for converting potassium sulfate to potassium carbonate comprising passing a mixture of potassium sulfate and calcium oxide to a reducing station and there reacting the mixture at a temperature in the range of between about 700° C. and about 800° C. with a gaseous mixture having a minor amount of hydrogen or carbon monoxide in a diluent wherein the calcium oxide is present in an amount not greater than about 20 percent by weight of the potassium sulfate to produce an aqueous mixture of potassium sulfide, potassium bisulfide, potassium hydroxide and calcium sulfide and a gaseous mixture of steam and hydrogen sulfide; passing the aqueous mixture to a quenching station and there adding water to produce an aqueous slurry of soluble potassium salts and insoluble calcium salts and a gaseous mixture of steam and hydrogen sulfide; passing the slurry to a filtering station and there separating the insoluble calcium salts from the aqueous solution of soluble potassium salts; passing the calcium salts to a drying station operated at a temperature of about 100° C. to produce calcium sulfide, calcium bisulfide and steam; passing the calcium sulfide and calcium bisulfide to a calcining station operated at a temperature of between about 800° C. and 1000° C. and introducing air thereto to produce calcium oxide recycled to the reducing station and sulfur dioxide; passing the soluble potassium salts from the filtering station to a carbonating station operated at a temperature of about 80° C. and introducing carbon dioxide gas to the aqueous solution of potassium salts to produce potassium carbonate and hydrogen sulfide; passing the potassium carbonate solution to an evaporating station to concentrate the potassium carbonate to precipitate potassium carbonate from solution and to produce steam which is condensed and recycled to the quenching station; passing the concentrated solution of potassium carbonate to a filtering station to separate solid potassium carbonate from the concentrated potassium-containing solution and recycling the concentrated potassium-containing solution along with the condensate to the quenching station.

These and other objects of the present invention may more readily by understood by reference to the following specification taken into conjunction with the drawings, in which:

DETAILED DESCRIPTION OF THE INVENTION

Figure 1:
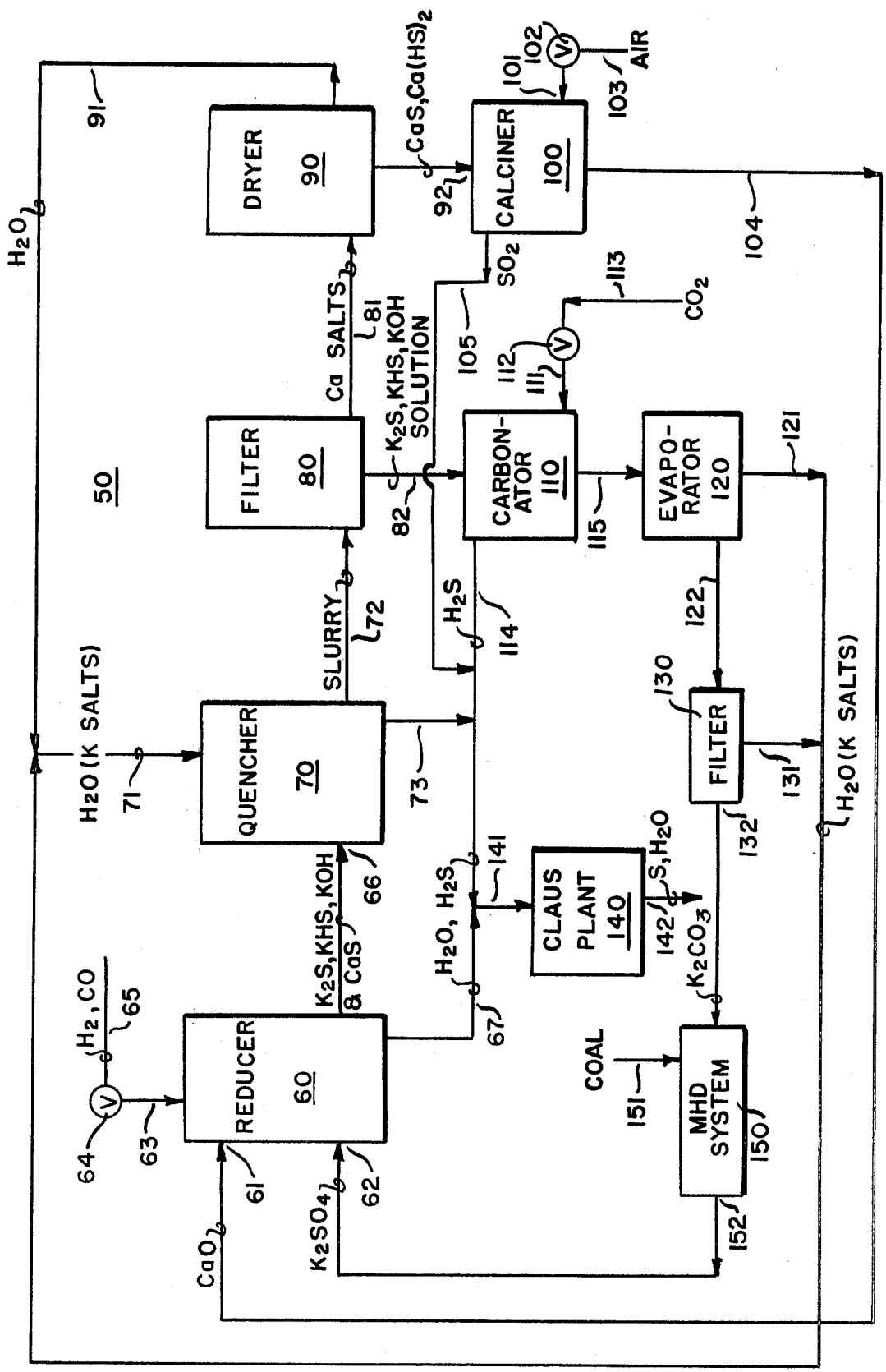
FIG. 1 is a flow diagram for the process of the present invention.

FIG. 1 is a diagrammatic flow chart showing the process of the present invention. The process is represented by the reference numeral 50 and includes a reducer 60 having an inlet line 61 for introducing calcium oxide to the reducer and an inlet line 62 for introducing potassium sulfate. Although both the calcium oxide and the potassium sulfate may be introduced to the reducer 60 in solid form, since the reducer 60 is operated at a temperature in the range of between about 700° C. and about 800° C., the calcium oxide and the potassium sulfate in mixture with potassium sulfide are liquid at that reaction temperature. An inlet line 63 having a valve 64 connected thereto serves to connect a source of producer gas 65 comprised principally of hydrogen and carbon monoxide to the reducer 60. These gases are preferably introduced to the reducer 60 in a diluent gas such as helium or nitrogen or argon or mixtures thereof, the preferred diluent being helium for safety reasons. The resident time of the potassium sulfate and calcium oxide within the reducer 60 is preferably one hour or less for an economical system. The reaction products produced in the reducer 60 include potassium sulfide, potassium bisulfide, potassium hydroxide and calcium sulfide all of which are liquid and exit through line 66. Steam, hydrogen sulfide and some of the potassium hydroxide leave the reducer 60 as gaseous reaction by-products through the outlet 67. The diagram comprising FIG. 1 is schematic in nature, and therefore, the location of the exit lines does not represent their precise physical location in the system 50.

A quencher 70 receives the liquid potassium sulfide, potassium bisulfide, potassium hydroxide and calcium sulfide from outlet 66 of the reducer 60 and facilitates the addition thereto of water from inlet line 71 comprised of effluents from the dryer 90 and the evaporator 120 and the filter 130, as will be disclosed. Additionally, make up water or steam (not shown) may be introduced into the quencher 70 to make up a slurry of soluble potassium salts and relatively insoluble calcium salts. During the temperature reduction in the quencher 70, steam and hydrogen sulfide evolve and exit from the quencher 70 through outlet pipe 73.

The slurry leaving the quencher 70 through pipe 72 is introduced to a filter 80 through which passes the soluble potassium-containing solution and which exits through pipe 82 while the generally insoluble calcium salts are filtered out of the solution and conducted by a pipe 81 or other means to a dryer 90. The dryer 90 is operated at a temperature of about 100° C. and evolves steam which is condensed and conducted by a pipe 91 to the inlet pipe 71 of the quencher 70. The calcium precipitates from the dryer 90 which comprise calcium sulfide and calcium bisulfide exit through pipe 92 to a calciner 100 which is preferably operated at a temperature in the range of from 800° C. to about 1000° C. and in which the calcium sulfide and calcium bisulfide are oxidized to form calcium oxide. To this end, an input line 101 having a valve 102 therein is connected to a source 103 of oxygen such as air which upon contact with the calcium sulfide and calcium bisulfide at the elevated temperature oxidizes same to the oxide which leaves the calciner 100 through pipe 104 connected to the inlet pipe 61 of the reducer 60. Simultaneous with the conversion of the calcium sulfides to the oxide is the evolution of sulfur dioxide which leaves the calciner 100 through outlet pipe 105.

The potassium-containing solution from the filter 80 leaves the filter through pipe 82 and is transmitted to a carbonator 110. The carbonator 110 is preferably operated within a temperature range of from about 80° C. to about 100° C. with the lower range of temperatures being preferred to reduce the solubility of the potassium carbonate in the aqueous solution. The aqueous potassium-containing solution is carbonated by means of carbon-dioxide entering the carbonator 110 through an inlet pipe 111 connected to a suitable valve 112 and to a source of carbon dioxide 113. Carbonation of the various potassium compounds results in the evolution of hydrogen sulfide which leaves the carbonator 110 through outlet pipe 114. The resultant aqueous solution of potassium carbonate is conducted through a pipe 115 to an evaporator 120, preferably operated at a temperature of 100° C., which concentrates the potassium carbonate-containing solution to cause precipitation of the potassium carbonate.

The condensed steam containing some potassium salts leaving the evaporator 120 is conducted by an outlet pipe 121 to the inlet pipe 71 of the quencher 70. The concentrated potassium carbonate-containing solution is transmitted by a pipe 122 to a filter 130 which separates the potassium carbonate crystals from the potassium carbonate-containing aqueous solution which is recycled by a pipe 131 to the input pipe 71 of the quencher 70. The potassium carbonate crystals plated onto the filter 130 leave through an outlet 132 and are dried to contain a water content not greater than about 10% by weight before being introduced as seed material to the MHD system 150 which also receives a sulfur-containing coal through an inlet 151. One of the by-products of the MHD system 150 is a combination of potassium sulfate and potassium carbonate contaminated with about 5 percent fly ash which leaves the MHD system 150 through an outlet 152 and is fed as an input material by an inlet 62 to the reducer 60 thereby completing the cycle.

The various components in the process 50 of the present invention such as the reducer 60, the quencher 70, the calciner 100 and the carbonator 110 all produce sulfur-containing compounds which are introduced to a Claus plant 140 through an inlet pipe 141. The Claus plant 140 utilizes known technology to produce sulfur and water which exit the plant in the present diagrammatic illustration through outlet 142. Specifically, water and hydrogen sulfide are produced in the reducer 60 and are conducted by an outlet 67 to the inlet 141 of the Claus plant 140; water and hydrogen sulfide are produced in the quencher 70 and are conducted by an outlet 73 to the inlet 141 of the Claus plant 140; sulfur dioxide is produced in the calciner 100 and is conducted by an outlet 105 to the inlet 141 of the Claus plant 140; and hydrogen sulfide is produced in the carbonator 110 and is conducted by an outlet 114 to the inlet 141 of the Claus plant 140. Accordingly, it is clear that all sulfur-containing compounds whether gaseous or liquid are collected in the process 50 of the present invention and are transmitted for further treatment and are not vented to the environment in contradiction of present EPA standards.

The most critical aspect of the process 50 is the reduction which takes place in the reducer 60. Although the temperature range of 700° C. to 800° C. is specified, the reaction temperature should be as low as possible to conserve energy while at the same time certain minimums must be maintained to ensure that the reaction proceeds at a reasonable rate. An hour has been selected as the maximum time span for the reduction reaction, and accordingly, the temperature should be selected such that the reaction proceeds to the required completion percentage within the allotted time. Preferably, the reaction temperature is maintained at about 750° C., higher temperatures being wasteful of energy and lower temperatures resulting in reaction rates too slow to accomplish the purposes of the present invention.

Although the present invention is directed to a potassium sulfate-converting system, it is contemplated within the scope of the invention that other alkali metals such as sodium or lithium also be treated by the subject process.

Additionally, although calcium oxide is specified and preferred, it is contemplated within the scope of the present invention to include the oxides of boron, zinc, iron and mixtures thereof. The amount of calcium oxide introduced to the reducer 60 through inlet 61 may vary from about 5% by weight of the potassium sulfate present to about 20% by weight, with 15% being the preferred weight.

Figure 2:
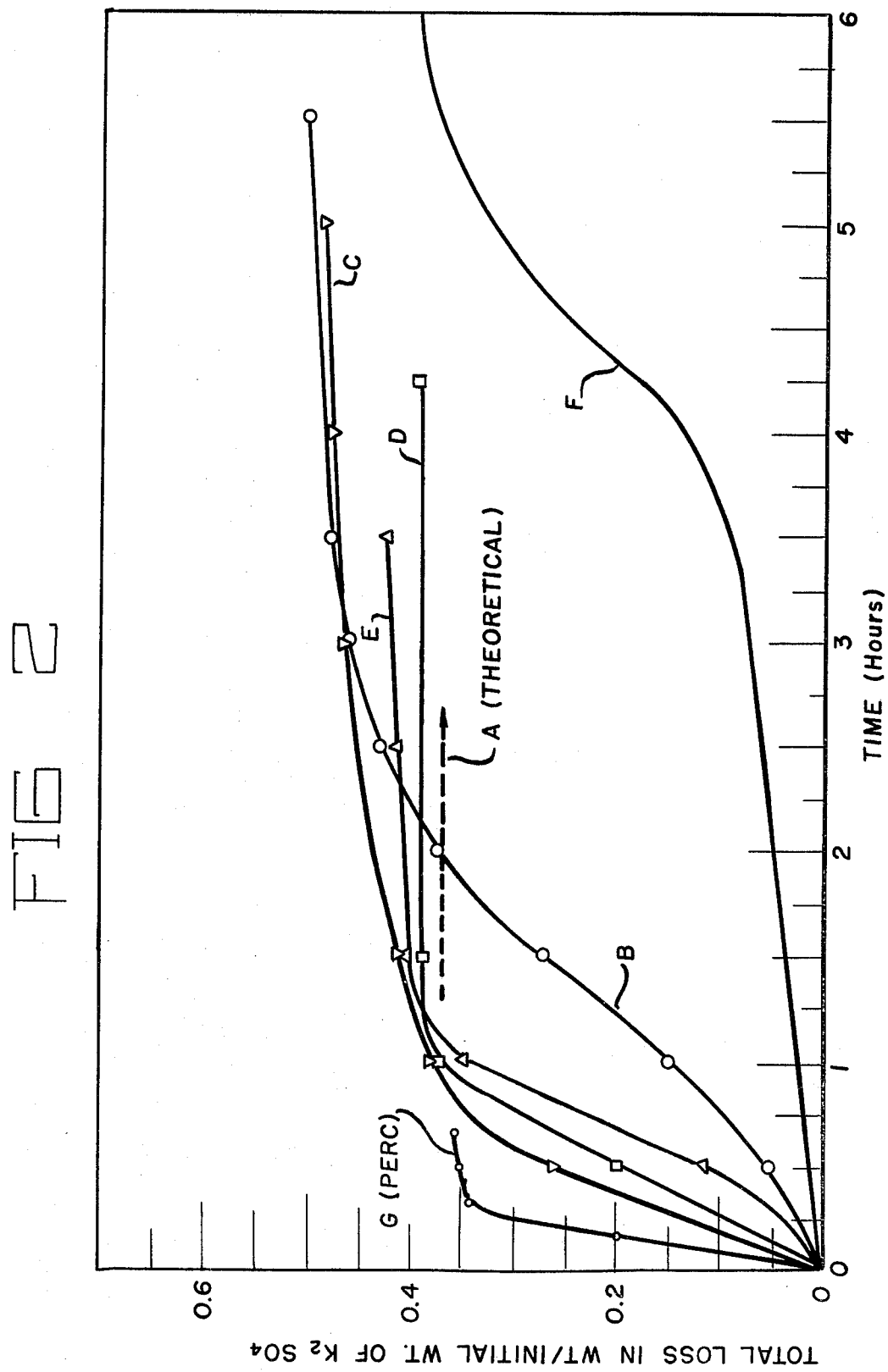
FIG. 2 is a family of curves showing the relationship between the total loss in weight during the reduction reaction divided by the initial weight of potassium sulfate plotted against lapsed time in hours.

Referring now to FIG. 2, there is a family of curves which shows the relationship between the fraction of weight loss of the initial potassium sulfate charge versus time lapse in hours for various amounts of calcium oxide and also for the PERC process. Curve A represents the theoretical weight loss of a charge of potassium sulfate entirely converted to potassium sulfide, the weight differential of a mole of potassium sulfide and a mole of potassium sulfate being 64 which divided by the molecular weight of the potassium sulfate is 0.368, the value of theoretical curve A.

Curve B shows the result of the reduction of potassium sulfate at 750° C. using a reducing gas comprised of helium containing three volume percent hydrogen introduced to the potassium sulfate charge at the rate of 600 cubic centimeters per minute. No calcium oxide was present, and as can be seen, the extent of reaction completion in one hour is relatively low, as indicated by the total weight loss being about 40% of the theoretical value. Unless otherwise indicated, these reduction conditions of temperature, hydrogen concentration in helium and gas flow rate also were used in gathering data for the remaining curves.

Curve C shows the result of the reduction of potassium sulfate with a 15 weight percent calcium oxide addition, that is the calcium oxide present was 15 weight percent of the potassium sulfate present in initial charge. As can be seen from curve C of the graph, more than 80% of the reaction was completed within the prescribed one hour time span. The reason that the graph exceeds the theoretical weight loss is that the presence of calcium oxide at high temperatures causes some of the potassium sulfide formed to react with the calcium oxide and water to form calcium sulfide and potassium hydroxide, some of which vaporizes thereby causing the greater than theoretical weight loss in the reaction. Nevertheless, the data show that a greater than 80 or 85 percent reaction completion occurs within the time span of about one hour.

Curve D represents the addition of 30 weight percent calcium oxide and Curve E represents data collected for the addition of 60 percent by weight calcium oxide. Both these curves illustrated that additional quantities of calcium oxide do not improve the reaction dynamics but worsen them as both the 30 percent and 60 percent curves, D and E respectively, achieve lower reaction rates within an hour than did the addition of 15 weight percent calcium oxide, as illustrated by curve C. It is believed that an acceptable range of calcium oxide addition is between about 5 weight percent and about 20 weight percent.

Curve F illustrates a reduction of potassium sulfate at 700° C. with the addition of 15 weight percent calcium oxide and with a reducing gas of helium with 6 volume percent hydrogen. As can be seen from the data, these parameters are insufficient to provide an acceptable reaction rate, whereby the temperature parameter is somewhat more critical to an acceptable reaction rate than is the amount of reducing gas in the diluent.

Finally, curve G represents data collected on the PERC process; however, the reaction parameters were not the same as with the data previously presented. The PERC data is based on a reactant gas of 100 percent hydrogen at a flow rate of 2400 cubic centimeters per minute and at a temperature of 750° C. As can be seen, the PERC data show an initial swift rise followed by a leveling off below the level obtained by the process of the present invention within the specified time span to demonstrate the advantages of the present invention. In addition, the PERC process uses considerably more hydrogen as reducing gas than the subject invention. It should be remembered that variations in temperature and volume percent reducing gas will affect the reaction rates and the completion percentages illustrated in FIG. 2. Nevertheless, the data collected and illustrated in FIG. 2 show the effect of the addition of a minor amount of lime to the reduction reaction, which permits an economical and rapid reduction to take place in order to regenerate potassium carbonate as a seed material for an open-cycle, coal-fired MHD power system.

Clearly, the producer gas flow rate and concentration can be increased from the illustrated values of about 600 cubic centimeters per minute and three to six volume percent. However, it is believed that concentrations of not greater than about twenty volume percent should suffice. Flow rates may increase relative to the amount of potassium sulfate being treated.

While there has been presented what is considered to be the preferred embodiment of the present invention, it is understood that various modifications and alterations may be made therein without departing from the true spirit and scope of the present invention, and it is intended to cover in the claims appended hereto all such modifications and alterations.

The embodiments of the invention in which an exclusive property or privilege is claimed are defined as follows:

1. A process for converting alkali metal sulfate to the corresponding carbonate comprising reacting the alkali metal sulfate with a gaseous mixture containing up to about 20 volume percent of a reductant selected from the group consisting of hydrogen, carbon monoxide and combinations thereof in an inert diluent with an oxide of a metal selected from the class consisting of calcium, zinc, iron and mixtures thereof present in the range of between about 5 percent by weight and about 20 percent by weight of the alkali metal sulfate at a temperature in the range of between about 700° C. and about 800° C. to convert not less than about eighty percent of the alkali metal sulfate alkali metal sulfide, bisulfide or hydroxide in a time span not to exceed about one hour producing said alkali metal sulfide, bisulfide or hydroxide, and the sulfide of the selected metal oxide; adding water to form an aqueous slurry of soluble alkali metal salts and insoluble salts; separating the insoluble salts from the aqueous phase; and carbonating the aqueous phase to form the alkali metal carbonate.

2. The process of claim 1, wherein the alkali metal is potassium.

3. The process of claim 2, wherein the gaseous mixture is not more than about 10 percent by volume hydrogen with the remainder helium, the reaction temperature is about 750° C., and the metal oxide is calcium oxide.

4. The process of claim 2, wherein the metal oxide is calcium oxide.

5. The process of claim 4, wherein the calcium oxide is present in an amount of about 15 percent by weight of the potassium sulfate.

6. The process of claim 1, wherein the gaseous mixture is comprised of not more than about 20 percent by volume hydrogen and the remainder helium, nitrogen, argon or mixtures thereof.

7. A process for converting potassium sulfate to potassium carbonate comprising passing a mixture of potassium sulfate and calcium oxide to a reducing station and there reacting said mixture for a time not to exceed about one hour to convert not less than about 80% of the sulfate potassium sulfide, potassium bisulfide, or potassium hydroxide at a temperature of about 750° C. with a gaseous mixture having a minor amount of up to about 20 volume percent reductants selected from the group consisting of hydrogen, carbon monoxide and mixtures thereof in an inert diluent wherein the calcium oxide is present in an amount not greater than about 20 percent by weight of the potassium sulfate to produce a liquid mixture of said potassium sulfide, potassium bisulfide or potassium hydroxide and calcium sulfide and a gaseous mixture of steam and hydrogen sulfide; passing the liquid mixture to a quenching station and there adding water to produce an aqueous slurry of soluble potassium salts and insoluble calcium salts and a gaseous mixture of steam and hydrogen sulfide; passing the slurry to a filtering station and there separating the insoluble calcium salts from the aqueous solution of soluble potassium salts; passing the calcium salts to a drying station operated at a temperature of about 100° C. to produce calcium sulfide, calcium bisulfide and steam; passing the calcium sulfide and calcium bisulfide to a calcining station operated at a temperature of between about 800° C. and 1000° C. and introducing air thereto to produce calcium oxide for recycle to the reducing station and sulfur dioxide; passing the soluble potassium salts from the filtering station to a carbonating station operated at a temperature of about 80° C. and introducing carbon dioxide gas to the aqueous solution of potassium salts to produce potassium carbonate and hydrogen sulfide; passing the potassium carbonate solution to an evaporating station to concentrate the potassium carbonate to precipitate potassium carbonate from solution and tc produce steam containing potassium salts recycled to the quenching station; passing the liquid phase containing precipitated potassium carbonate from the evaporating station to a filtering station to separate solid potassium carbonate therefrom and recycling the concentrated potassium-containing filtrate to the quenching station.

8. The process of claim 7, wherein the gaseous products from the reducing station and the quenching station and the calcining station are collected and passed to a sulfur-reclaiming station.

9. The process of claim 7, wherein the reactant gaseous mixture in the reducing station is helium with less than about 10 percent by volume hydrogen.

10. The process of claim 7, wherein the solid potassium carbonate from the filtering station is dried to have a water content of less than about 10 percent by weight.

* * * * *